United States Patent
Kim et al.

(10) Patent No.: US 7,047,040 B2
(45) Date of Patent: May 16, 2006

(54) PORTABLE COMPUTER

(75) Inventors: Moon-kyou Kim, Suwon (KR); Byung-lae Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 542 days.

(21) Appl. No.: 10/184,945

(22) Filed: Jul. 1, 2002

(65) Prior Publication Data

US 2003/0087666 A1 May 8, 2003

(30) Foreign Application Priority Data

Nov. 6, 2001 (KR) ............................... 2001-68918

(51) Int. Cl.
*H04B 1/38* (2006.01)
*H04M 1/00* (2006.01)

(52) U.S. Cl. .................. 455/557; 455/343.1; 455/574; 713/323; 713/324

(58) Field of Classification Search ............. 455/556.1, 455/557, 558, 344, 347, 550.1, 575.1, 90.2, 455/90.3, 572, 574, 343.1; 713/300, 320, 713/323, 324; 375/222
See application file for complete search history.

(56) References Cited

U.S. PATENT DOCUMENTS

| 6,028,984 | A | 2/2000 | Kimball | |
|---|---|---|---|---|
| 6,311,282 | B1 | 10/2001 | Nelson et al. | |
| 6,512,754 | B1 * | 1/2003 | Feder et al. | 455/557 |
| 6,516,204 | B1 * | 2/2003 | Funk et al. | 455/557 |
| 6,529,743 | B1 * | 3/2003 | Thompson et al. | 455/557 |

FOREIGN PATENT DOCUMENTS

| JP | 10-177436 | 6/1998 |
|---|---|---|
| JP | 2000-75972 | 3/2000 |
| JP | 2001-69141 | 3/2001 |
| KR | 96-6529 | 2/1996 |
| KR | 97-20038 | 5/1997 |
| KR | 2000-3219 | 2/2000 |

OTHER PUBLICATIONS

Office Action issued by SIPO, issue date Apr. 23, 2004.

* cited by examiner

*Primary Examiner*—Quochien B. Vuong
(74) *Attorney, Agent, or Firm*—Staas & Halsey LLP

(57) ABSTRACT

A portable computer includes a main body equipped with a main board with a CPU, and a power supply supplying electric power to the main board, the portable computer further including a wireless communicating part including an RF transmitting and receiving part provided at the main body, electrically connected to the main board, and wirelessly transmitting and receiving predetermined data using an RF signal, and an AD converter converting an analog signal received through the RF transmitting and receiving part into a digital signal and transmitting the digital signal to the CPU, and converting a digital signal from the CPU into an analog signal and transmitting the analog signal through the RF transmitting and receiving part. The portable computer further includes a connector electrically connected to the power supply and delivering electric power from the power supply to the wireless communicating part, a wireless modem software program operating the wireless communicating part, and a control part controlling the connector to deliver electric power from the power supply to the wireless communicating part so as to operate the wireless communicating part when the wireless modem software program is executed in order to operate the wireless communicating part. Accordingly, the portable computer is capable of wireless data communication without an extra peripheral unit.

12 Claims, 4 Drawing Sheets

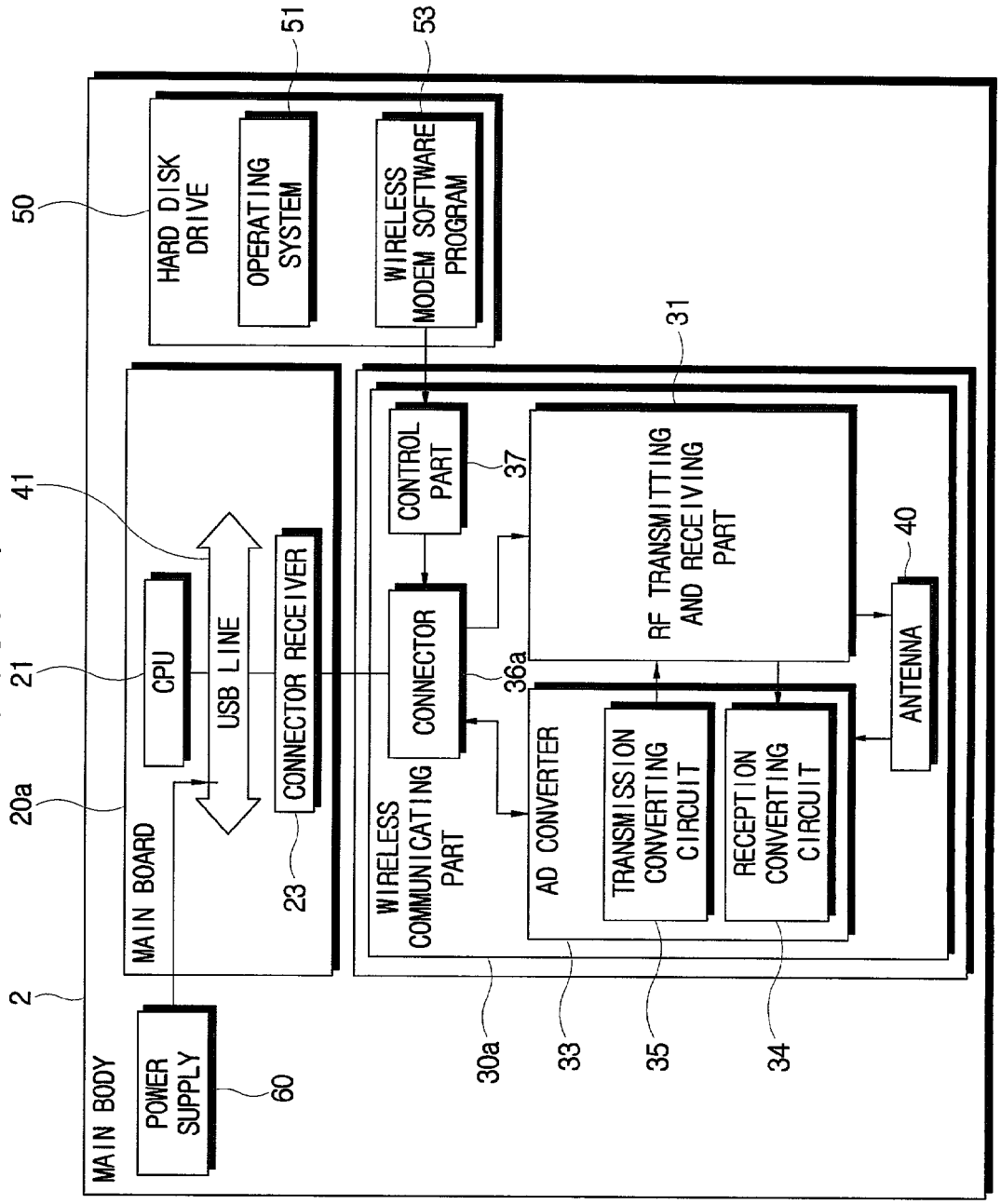

PORTABLE COMPUTER

CROSS-REFERENCE TO RELATED APPLICATIONS

This application claims the benefit of Korean Application No. 2001-68918, filed Nov. 6, 2001, in the Korean Intellectual Property Office, the disclosure of which is incorporated herein by reference.

BACKGROUND OF THE INVENTION

1. Field of the Invention

The present invention relates in general to a portable computer, and more particularly, to a portable computer capable of wireless data communication without extra peripheral devices.

2. Description of the Related Art

Contrary to a desktop computer, in a portable computer emphasis is on portability, simplicity, and capability equivalent to the desktop computer. A portable computer can be defined as all computers handy to carry, for example, a laptop computer, a notebook computer, a palmtop computer, etc.

As an advantage of the portable computer, the portability thereof, in cooperation with the technology of a wireless modem, enables network communication anywhere.

As shown in FIG. 1, a conventional portable computer capable of wireless modem communication is comprised of a wireless modem card 110 for data communication to be connected to a PCMCIA (personal computer memory card international association) card slot (not shown) or a USB (universal serial bus) port (not shown) provided at a main body 102, a cellular phone 120 wirelessly accessing a predetermined server (not shown) and transmitting and receiving data to the server, a cable 130 connecting the cellular phone 120.

The wireless modem card 110 converts a digital signal from the main body 102 into an analog signal, and transmits the analog signal to the server through the cellular phone 120. Further, the wireless modem 110 converts an analog signal received from the server through the cellular phone 120 into a digital signal, and transmits the digital signal to the main body 102.

As described above, in the conventional portable computer, wireless data communication is possible at any place by accessing the server through the cellular phone 120 electrically connected to the wireless modem card 110.

However, in the conventional portable computer, if any one of the wireless modem card, the cellular phone and the cable connecting the wireless modem card and the cellular phone is not provided, the wireless data communication is impossible.

SUMMARY OF THE INVENTION

Accordingly, a portable computer capable of wireless data communication without extra peripheral devices is provided.

Additional objects and advantages of the invention will be set forth in part in the description which follows and, in part, will be obvious from the description, or may be learned by practice of the invention.

This and other objects of the present invention may be accomplished by a portable computer comprising a main body equipped with a main board with a CPU, and a power supply supplying electric power to the main board, further comprising a wireless communicating part including an RF transmitting and receiving part provided at the main body, electrically connected to the main board, and wirelessly transmitting and receiving predetermined data using an RF signal, and an AD converter converting an analog signal received through the RF transmitting and receiving part into a digital signal and transmitting the digital signal to the CPU, and converting a digital signal from the CPU into an analog signal and transmitting the analog signal through the RF transmitting and receiving part, and a connector electrically connected to the power supply and delivering electric power from the power supply to the wireless communicating part; a wireless modem software program operating the wireless communicating part; and a control part controlling the connector to deliver electric power from the power supply to the wireless communicating part so as to operate the wireless communicating part when the wireless modem software program is executed in order to operate the wireless communicating part.

According to an aspect of the present invention, the wireless communicating part is provided at the main board. The wireless communicating part may be comprised of a sub-board separated from the main board and electrically connected to the main board. The connector may include a USB line through which data is transmitted between the main board and the AD converter. The connector controls the electric power supplied to the wireless communicating part, and the control part controls the electric power from the power supply to be supplied to the wireless communicating part by transmitting a control signal to the connector when the wireless modem software program is run in order to operate the wireless communicating part.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 4 is a block diagram of a portable computer according to another embodiment of the present invention.

DETAILED DESCRIPTION OF THE PREFERRED EMBODIMENT

Figure 1:
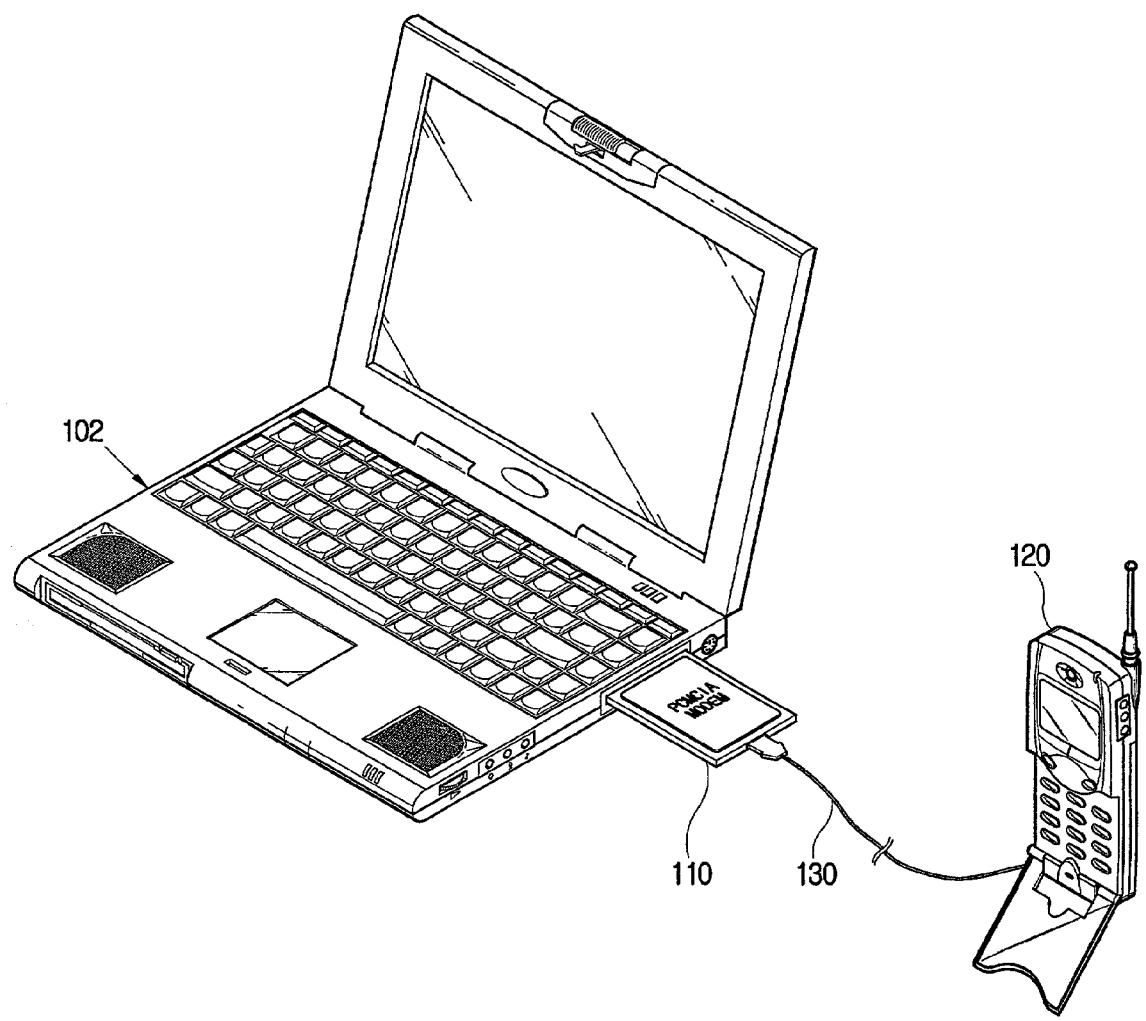
FIG. 1 is a view illustrating a conventional portable computer capable of wireless modem communication.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
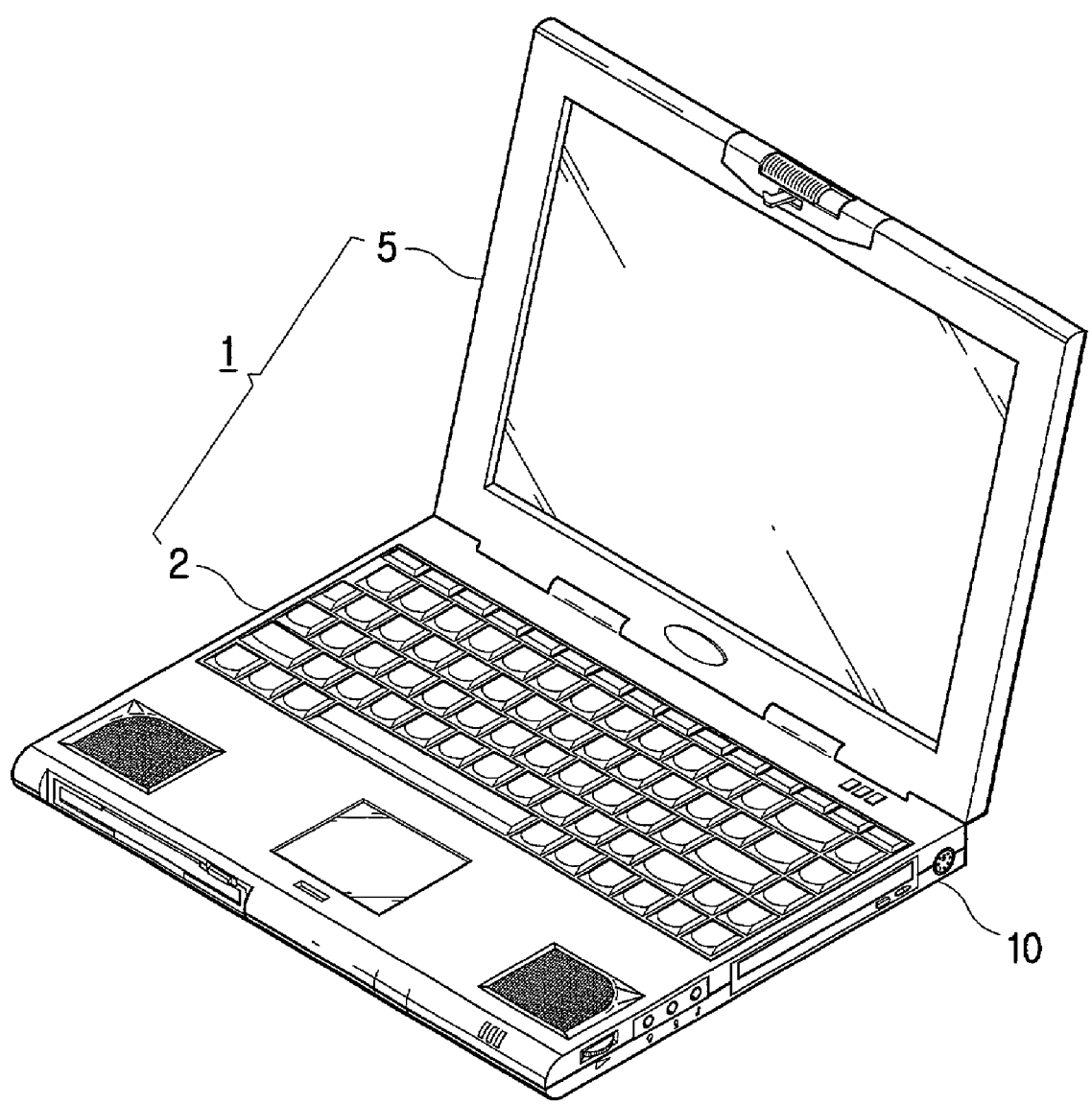
FIG. 2 is a perspective view of a portable computer according to an embodiment of the present invention.
Figure 3:
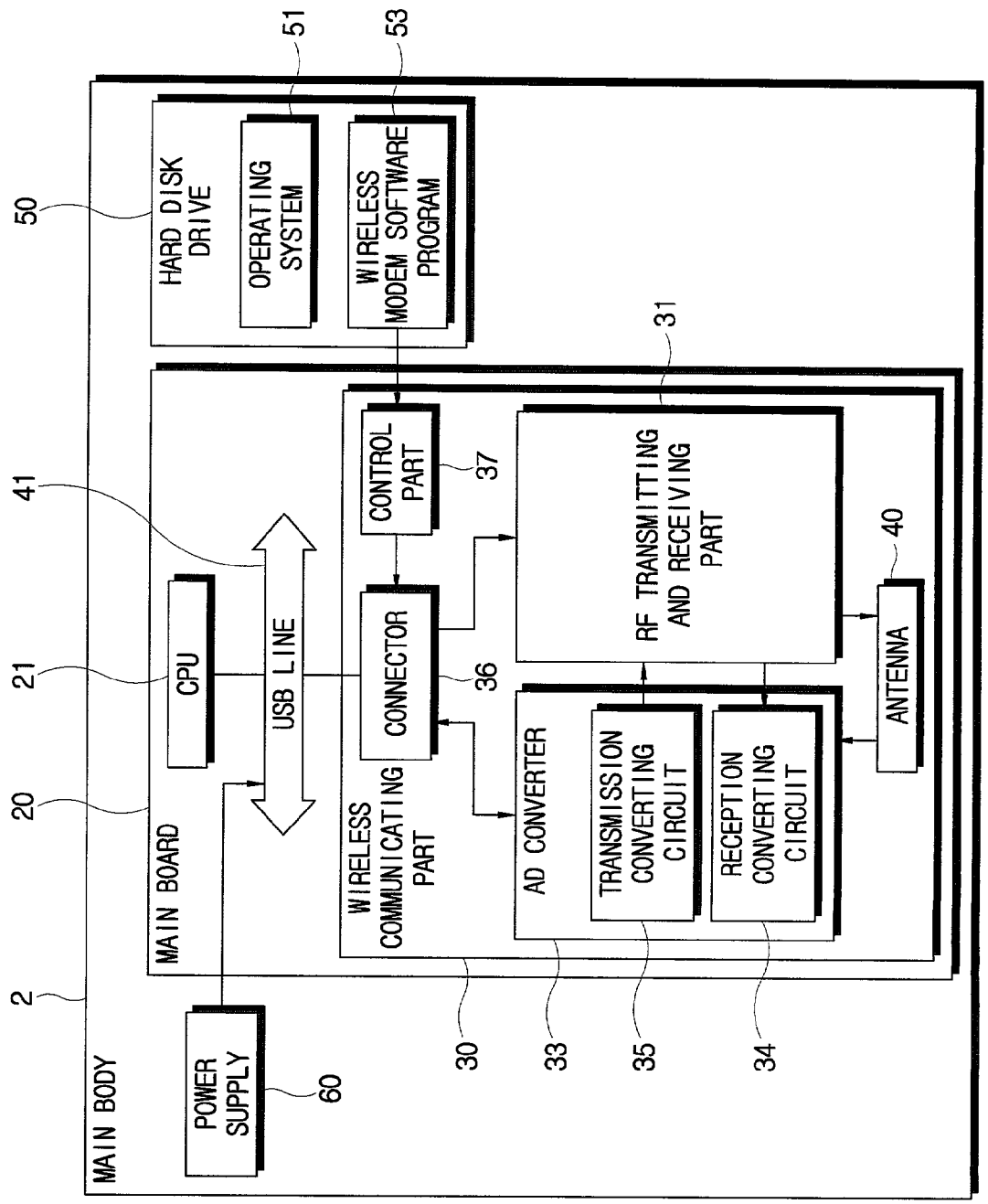
FIG. 3 is a block diagram of the portable computer according to as shown in FIG. 2.

As shown in FIGS. 2 and 3, a portable computer 1 comprises a main body 2 equipped with a CPU (central processing unit) 21, and an LCD (liquid crystal display) 5 displaying a picture from a picture signal received from the main body 2.

The main body 2 includes a casing 10 forming an external appearance, a main board 20 mounted with a BIOS-ROM (basic input/output system-read only memory: not shown) booting a computer system, a hard disk drive 50 in which an operating system 51 is stored, and a plurality of hardware components such as a power supply 60 supplying electric power to the computer system.

A wireless modem software program 53 as well as the operating system 51 are stored in the hard disk drive 50 (e.g., Windows). The wireless modem software program 53 drives a wireless communicating part 30 (to be described later) to allow the computer system to access a predetermined server, thereby transmitting and receiving data to/from the server.

The wireless communicating part 30 comprising an RF (radio frequency) transmitting and receiving part 31 wirelessly transmitting and receiving predetermined data by using an RF signal, an AD converter 33 converting a digital signal into an analog signal and vice versa so as to be transmitted and received through the RF transmitting and receiving part 31, a connector 36 delivering electric power from the power supply 60, and a control part 37 controlling electric power supplied through the connector 36 are provided in the main board 20.

The RF transmitting and receiving part 31 is operated by the wireless modem software program 53 stored in the hard disk drive 50, and accesses the server by an operation of a user, thereby wirelessly transmitting and receiving data to/from the server. The RF transmitting and receiving part 31 transmits an analog signal converted by the AD converter 33 to the server through an antenna 40 using the RF signal. Further the RF transmitting and receiving part 31 receives an analog signal from the server through the antenna 40, and transmits the signal to the main body 2 via the AD converter 33.

The AD converter 33 is comprised of a reception converting circuit 34 down-converting a predetermined IF (intermediate frequency) analog signal received by the RF transmitting and receiving part 31 through the antenna 40 into a base band analog signal and then converting the base band analog signal into a digital signal, and a transmission converting circuit 35 converting a digital signal from the CPU 21 into a base band analog signal and then up-converting the base band analog signal into an IF analog signal, thereby transmitting the IF analog signal through the RF transmitting and receiving part 31.

As shown in FIG. 3, the connector 36 is electrically connected to a USB line of the main board 20, and delivers electric power from the power supply 60 to the wireless communicating part 30 according to control of the control part 37. Further, the connector 36 delivers the data received by the RF transmitting and receiving part 31 and converted into a digital signal by the AD converter 33 to the CPU 21 through the USB line 41, and delivers the digital signal received from the CPU 21 through the USB line 41 to the transmission converting circuit 35 of the AD converter 33.

The control part 37 is comprised of a micro-controller provided in the wireless communicating part 30, and controls the connector 36, so as to control the electric power delivered from the CPU 21 to the wireless communicating part 30. The connector 36 cuts off the electric power from the power supply 60 when the wireless modem software program 53 is not executing. However, the control part 37 electrically controls the connector 36 to deliver the electric power from the power supply 60 to the wireless communicating part 30 when the wireless modem software program 53 is executing.

With this configuration, to perform wireless data communication in the portable computer 1, if a user executes the wireless modem software program 53 stored in the hard disk drive 50, then the wireless modem software program 53 commands the control part 37 to transmit a control signal to the connector 36. According to the control signal of the control part 37, the connector 36 delivers the electric power from the power supply 60 to the wireless communicating part 30, thereby operating the wireless communicating part 30.

The wireless communicating part 30 accesses the server through the RF transmitting and receiving part 31, thereby wirelessly transmitting and receiving data to/from the server. Herein, digital data from the CPU 21 is transmitted to the transmission converting circuit 35 of the AD converter 33 through the USB line 41 of the connector 36. Then, the transmission converting circuit 35 converts the digital data received through the USB line 41 into the base band analog signal, up-converts the base band analog signal into an IF analog signal, and transmits the IF analog signal to the RF transmitting and receiving part 31. Thus, the RF transmitting and receiving part 31 transmits the IF analog signal to the server through the antenna 40.

Further, an IF analog signal received from the server through the RF transmitting and receiving part 31 is transmitted to the reception converting circuit 34 of the AD converter 33. The reception converting circuit 34 down-converts the received IF analog signal into the base band analog signal, converts the base band analog signal into a digital signal, and transmits the digital signal to the CPU 21 through the USB line 41.

On the other hand, if a user turns off the wireless modem software program 53 operating the wireless communicating part 30, the control parts 37 transmits a control signal to the connector 36, and controls the connector 36 to cut off the electric power from the power supply 60 to the wireless communicating part 30. Thus the control part 37 controls the electric power supplied from the power supply 60 to the wireless communicating part 30 so that the electric power is efficiently controlled. Further, since the wireless communicating part 30 is mounted on the portable computer 1, the portable computer 1 can perform the wireless data communication without extra peripheral devices such as a cable 130 as shown in FIG. 1.

In the above description, the wireless communicating part 30 is provided in the main board 20. However, as shown in FIG. 4, another embodiment of the present invention may be also achieved by providing a wireless communicating part 30a on a sub-board separated from and electrically connected to a main board 20a. In this case, in the main board 20a is provided with a connector receiver 23 for a connector 36a of a wireless communicating part 30a, for data communication and electric power supply.

In the above description, the control part 37 is comprised of the microcontroller provided in the wireless communicating part 30a. However, the control part 37 may be comprised of a device driver of the wireless communicating part 30a. In this case, the control part 37 is operated while booting the operating system 51, and controls the connector 36a by transmitting a control signal to the connector 36a when the wireless modem software program 53 operates the wireless communicating part 30a.

As described above, by an RF transmitting and receiving part 31 transmitting and receiving predetermined data using an RF signal, and an AD converter 33 converting a digital signal into an analog signal and vice versa so as to be transmitted and received through the RF transmitting and receiving part 31, a portable computer 1 can perform the wireless data communication without extra peripheral devices such as a cable 130 as shown in FIG. 1.

As above-described a portable computer, which is capable of wireless data communication without an extra peripheral unit, is provided.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A portable computer including a main body equipped with a main board with a CPU, and a power supply supplying electric power to the main board, the portable computer comprising:

a wireless communicating part including an RF transmitting and receiving part provided in the main body, electrically connected to the main board, and wirelessly transmitting and receiving predetermined data using an RF signal, and an AD converter converting an analog signal received through the RF transmitting and receiving part into a digital signal and transmitting the digital signal to the CPU, and converting a digital signal from the CPU into an analog signal and transmitting the analog signal through the RF transmitting and receiving part, and a connector electrically connected to the power supply and delivering electric power from the power supply to the wireless communicating part;

a wireless modem software program operating the wireless communicating part; and a control part controlling the connector to prevent from delivering the electric power from the power supply to the wireless communicating part when the wireless modem software program is not executed to operate the wireless communicating part.

2. The portable computer according to claim 1, wherein the wireless communicating part is provided in the main board.

3. The portable computer according to claim 1, wherein the wireless communicating part comprises a sub-board separated from the main board and electrically connected to the main board.

4. The portable computer according to claim 2, wherein the connector comprises a USB line through which data is transmitted between the main board and the AD converter.

5. The portable computer according to claim 2, wherein:

the connector controls the electric power supplied to the wireless communicating part, and the control part controls the electric power from the power supply to be supplied to the wireless communicating part by transmitting a control signal to the connector when the wireless modem software program is executed to operate the wireless communicating part.

6. The portable computer according to claim 3, wherein the connector comprises a USB line through which data is transmitted between the main board and the AD converter.

7. The portable computer according to claim 3, wherein:

the connector controls the electric power supplied to the wireless communicating part, and the control part controls the electric power from the power supply to be supplied to the wireless communicating part by transmitting a control signal to the connector when the wireless modem software program is executed to operate the wireless communicating part.

8. A portable computer comprising:

a main board including a CPU; and a wireless modem, said main board supplied with electric power from a power supply, the wireless modem operatively communicating with the CPU to send and receive digital signals therebetween, wherein the wireless modem includes an AD converter converting an analog signal to a digital signal, an RF transmitting and receiving part transmitting and/or receiving an analog signal which is converted by said AD converter and sent as a digital signal to said CPU;

a control part operatively switching electric power supplied from the power supply to the wireless modem in response to a wireless modem software program.

9. The portable computer according to claim 8, wherein the wireless modem is provided as a sub-board separated from the main board and electrically connected to the main board.

10. The portable computer according to claim 8, further comprising a connector connecting a sub-board to the main board and including a USB line through which data is transmitted between the main board and the AD converter.

11. A method of wireless network communication using a portable computer having a wireless modem software program and a network server, the method comprising:

converting an analog signal received from the network server by an antenna of the portable computer into a digital signal;

transmitting the digital signal converted from the analog signal to a CPU;

converting a digital signal received from the CPU into an analog signal;

transmitting to the network server by the antenna of the portable computer the analog signal converted from the digital signal received from the CPU; and switching electric power for each respective converting and transmitting based on whether the wireless modem software program is executed.

12. The method according to claim 11, wherein said switching further comprises transmitting a control signal to turn on the electric power to a wireless modem when the wireless modem software program is executed.

* * * * *